United States Patent
Winder et al.

[11] Patent Number: 5,088,153
[45] Date of Patent: Feb. 18, 1992

[54] EXPANSION ANCHOR

[75] Inventors: Kenneth R. Winder, 1307 Greenwood Crescent, Oakville, Ontario, Canada, L5L 2M7; Ann M. Wilkins, Etobicoke, Canada

[73] Assignee: Kenneth R. Winder, Oakville, Canada

[21] Appl. No.: 569,833

[22] Filed: Aug. 20, 1990

[30] Foreign Application Priority Data

Aug. 21, 1989 [CA] Canada ................................. 608873

[51] Int. Cl.5 ............................................. F16B 13/04
[52] U.S. Cl. ................. 16/108; 16/DIG. 41; 411/60
[58] Field of Search ................. 16/108, 109, DIG. 41, 16/DIG. 24; 411/40, 41, 55, 60, 21

[56] References Cited

U.S. PATENT DOCUMENTS

| | | | |
|---|---|---|---|
| 1,628,636 | 5/1927 | Dominick | 16/109 |
| 1,855,482 | 4/1932 | McArthur | 16/108 |
| 3,217,583 | 11/1965 | Fulop | 411/41 |
| 4,391,559 | 7/1983 | Mizusawa | 411/60 |
| 4,659,270 | 4/1987 | Herb | 411/60 |

FOREIGN PATENT DOCUMENTS 1141913 2/1969 United Kingdom ................. 411/60

Primary Examiner—Richard K. Seidel
Attorney, Agent, or Firm—Kramer, Brufsky & Cifelli

[57] ABSTRACT

In a trophy having a figurine mounted on a support base, an adapter or ferrule permits ready assembly and inter-change of the figurine. The adapter is mounted in a bore of the support base. The adapter has a tubular wall defining a central passage which axially receives a threaded rod of the figurine. One or more resilient, deformable gripping fingers is formed integrally with the tubular wall and extends into the central passage. Each gripping finger has an associated slot extending through the tubular wall. A first portion of each gripping finger is outwardly displaceable by the threaded rod through its associated slot, while a second portion of each gripping finger projects inwardly of the passage to grippingly engage the threaded rod. The gripping fingers are severable from the adapter by a twisting force applied to the threaded rod received in the central passage for ready release of the threaded rod from the adapter. The adapter can be replaced for mounting a different figurine on the support base.

10 Claims, 4 Drawing Sheets

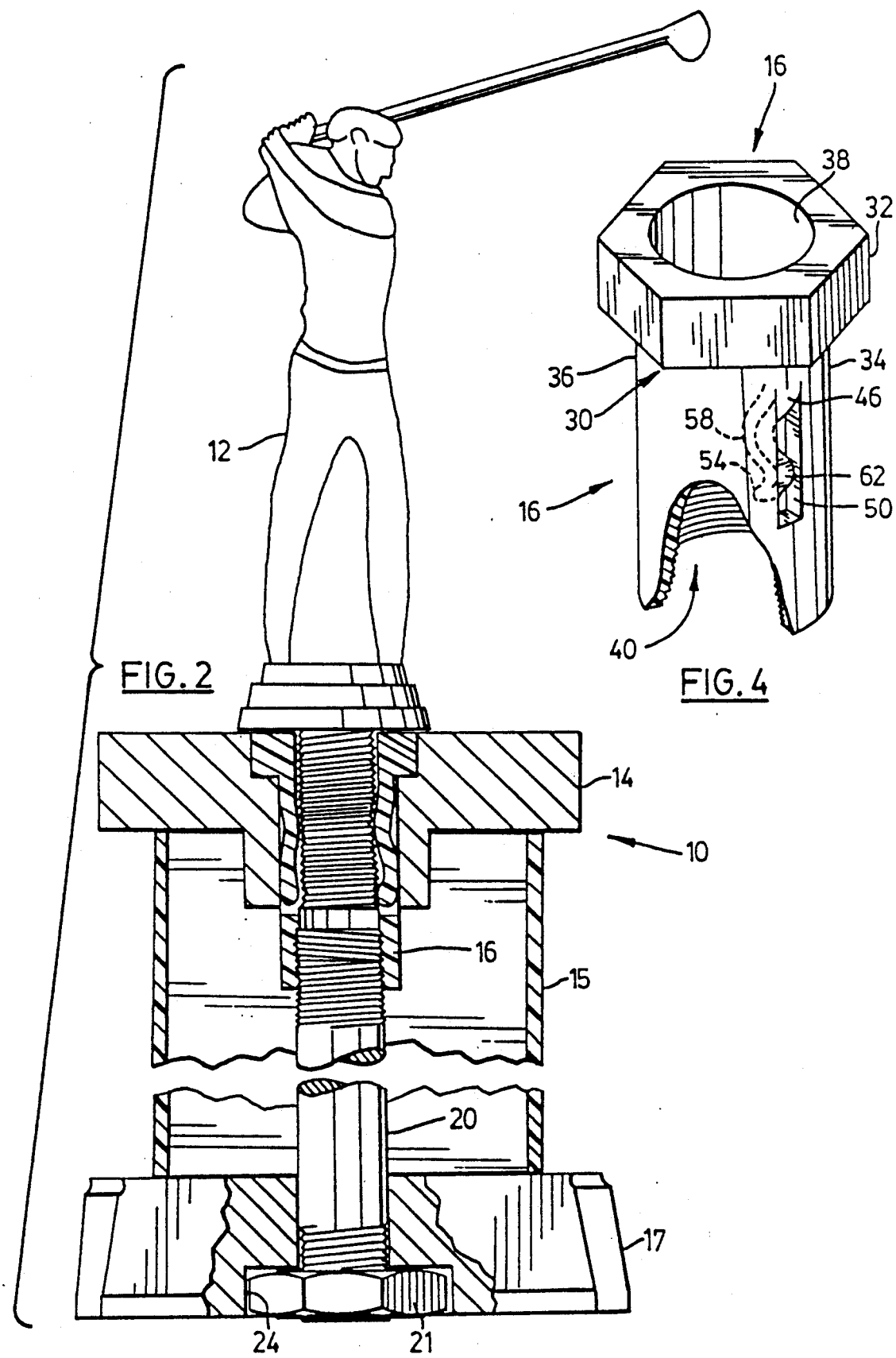

EXPANSION ANCHOR

FIELD OF THE INVENTION

This invention relates to an adapter or ferrule for trophies, more especially the invention is concerned with an adapter or ferrule which simplifies the assembly of a figurine of a trophy on a trophy support base.

Trophies typically comprising a figurine mounted on a column located on a base are widely employed in amateur, college and professional sports and other interests and activities. Thus a golf trophy may feature a figurine of a golf player mounted on top of a column, which in turn is mounted on a base or pedestal.

Assembly of figurines on support bases of conventional trophies is laborious and time consuming, due to the difficulty of aligning the figurines properly, so that generally it is necessary to keep a large stock of ready assembled trophies on hand for various types of contests, or team sports, for example, golf, tennis and curling.

BRIEF DESCRIPTION OF THE PREFERRED EMBODIMENT

The purpose of this invention is to provide a simple economic device for the ready completion of sub-assembled trophies, and for the quick interchange of figurines of assembled trophies.

In particular, the invention provides a disposable adapter or ferrule for quickly and securely mounting a figurine in a trophy column or base.

In accordance with one aspect of the invention an adapter is provided for removably mounting a body, for example, a trophy figurine, having a support rod, on a support base. The adapter comprises a tubular element having a tubular wall adapted to be mounted in a bore of a support base, the element having a central passage for axially receiving a support rod of the body to be mounted on the support base. At least one resilient, deformable gripping member is formed integral with the tubular wall and extends into the central passage to engage and retain the support rod located therein. A slot in the tubular wall is associated with each gripping member, and means is provided for retaining the tubular element in the bore.

In another aspect of the invention there is provided a trophy assembly comprising a support base having a bore formed therein, a figurine having a support rod and an adapter of the invention as herein before described mounted in the bore.

In still another aspect of the invention there is provided a method of assembling a trophy employing an adapter of the invention.

BRIEF DESCRIPTION OF THE DRAWINGS

The invention is illustrated in a particular and preferred embodiments by reference to the accompanying drawings, in which:

FIG. 2 is an enlarged vertical sectional view of the trophy of FIG. 1;

FIG. 4 is a cut away perspective view of the adapter of the trophy of FIGS. 1 and 2;

With reference to FIG. 1, a trophy 10 comprises a figurine 12 mounted on a support base 13. Support base 13 includes an upper portion 14, an intermediate tubular portion 15 and a lower portion 17.

Figure 3:
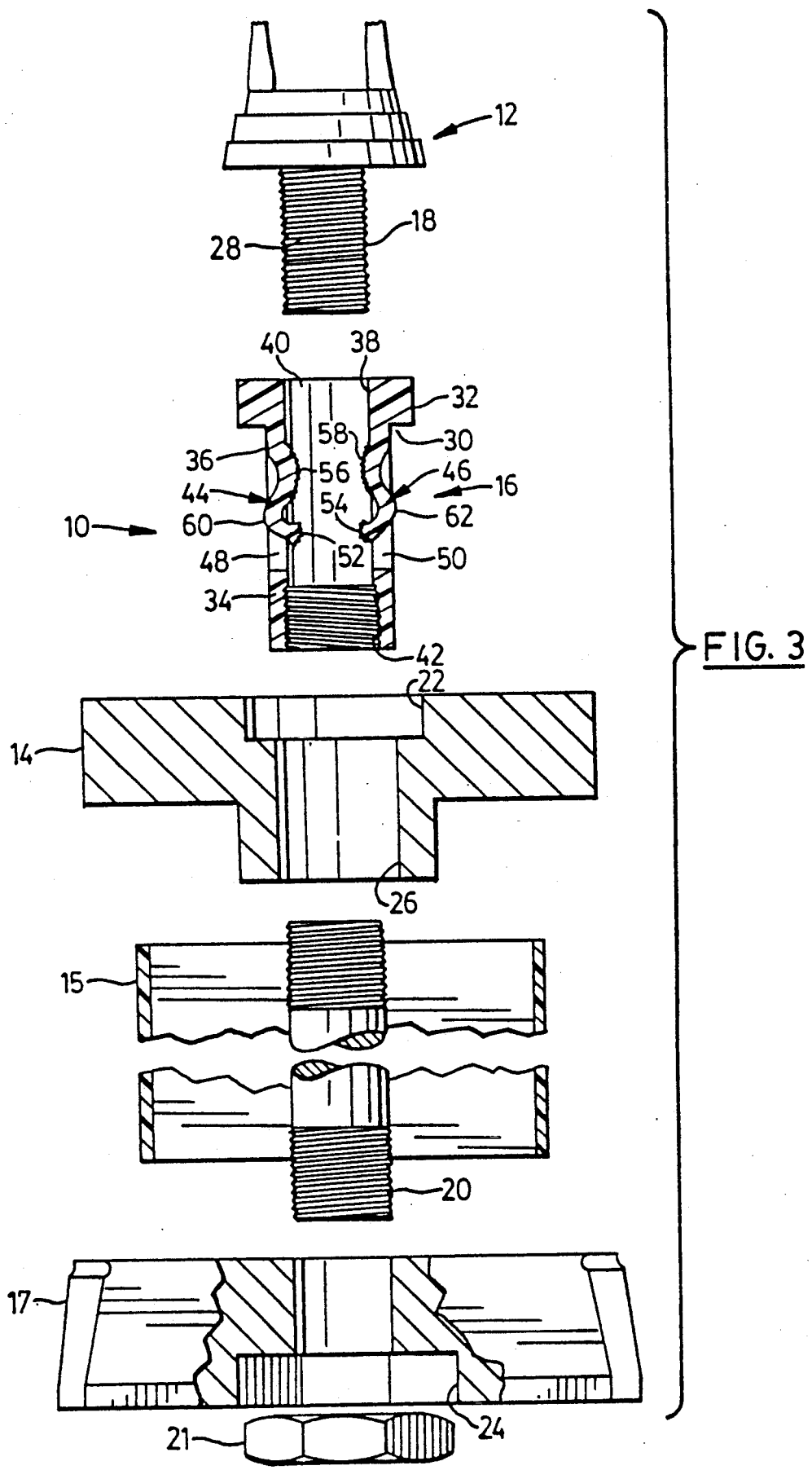
FIG. 3 is an exploded sectional view of the trophy of FIGS. 1 and 2.

With further reference to FIGS. 2, 3 and 4, the trophy 10 further includes a tubular element, ferrule or adapter 16, a threaded connector or rod 20 and a nut 21. Figurine 12 includes a threaded support rod 18, having threads 28, although this could be a ribbed or knurled rod, if desired. For the purposes of this disclosure, the term "threaded" in reference to rod 18 is intended to include any type of shaft that would give a sufficiently secure fit in adapter 16, as described further below.

The upper portion 14 of support base 13 includes an upper recess 22 and a centrally disposed smooth bore 26 formed therein. The lower portion 17 of support base 13 includes a lower recess 24 to accommodate nut 21.

With particular reference to FIGS. 3 and 4, adapter 16 is composed of a tubular cylindrical body 30 having a hexagonal tubular head 32 and a tubular wall 34 having a smooth outer surface 36 and an inner surface 38. Inner surface 38 defines a tubular passage 40. Inner surface 38 has a threaded lower portion 42 at one end remote from hexagonal tubular head 32. Recess 22 in upper portion 14 is also hexagonal in plan view to accommodate the hexagonal head 32 to prevent adapter 16 from turning.

Gripping fingers or members 44 and 46 extend generally inwardly of tubular passage 40 from opposed sides of inner surface 38.

Slots 48 and 50 are formed in opposed sides of tubular wall 34 and extend between outer surface 36 and inner surface 38. Slot 48 is located immediately behind gripping member 44 and slot 50 is located immediately behind gripping member 46.

Gripping members 44 and 46 are of generally serpentine configuration terminating in enlarged distal end portions 52 and 54 respectively, the end portions 52 and 54 extending inwardly of inner surface 38. End portions 52 and 54 are ribbed to engage the threaded support rod 18, but they do not have to be.

Gripping member 44 has an inner gripping portion 56 and gripping member 46 has a similar inner gripping portion 58, extending generally inwardly of inner surface 38, again to grip or retain the threaded support rod 18. Again, inner gripping portions 56, 58 can be ribbed to improve the grip on rod 18, if desired, but this also is not necessary.

Gripping member 44 has an intermediate locking portion 60 extending outwardly of outer surface 36 through slot 48 and gripping finger 46 similarly has an intermediate locking portion 62 extending outwardly of outer surface 36 through slot 50.

In assembly, adapter 16 is inserted into the upper portion 14 of support base 13 so that smooth outer surface 36 of adapter 16 mates with smooth bore 26 of upper portion 14 and hexagonal tubular head 32 mates with upper recess 22.

In order to firmly locate adapter 16 in upper portion 14, threaded connector 20 is first screwed into adapter 16 to threadedly engage threaded portion 42 of tubular passage 40. Connector 20 then extends into lower portion 17 through tubular portion 15. Nut 21 is then screwed onto threaded connector 20 and is received in lower recess 24 to hold this sub-assembly together.

To mount figurine 12 on support base 13, support rod 18 of figurine 12 is inserted into tubular passage 40 from the upper end thereof remote from threaded connector 20, and the figurine is simply pushed downwardly. Rod 18 forces intermediate gripping portions 56 and 58 and the free ends 52 and 54 outwardly, thus urging the resilient deformable gripping fingers or members 44 and 46 outwardly through slots 48 and 50 respectively, to bring intermediate locking portions 60 and 62 into engagement with smooth bore 26.

In this way the gripping portions 56 and 58 and free ends 52 and 54 grippingly engage the threads 28 of support rod 18 and the locking portions 60 and 62 are tightly deformed against smooth bore 26 to lock figurine 12 tightly in position so as to be securely supported on support base 13.

In the event that it is desired to remove figurine 12 and support a different figurine 12 on support base 13, several options are available. First, figurine 12 could just be unscrewed to remove support rod 18 from adapter 16. Second, the figurine can be rotated relative to adapter 16 as if to tighten or advance rod 18 into adapter 16, which rotation twists and severs or breaks gripping members 44 and 46 from adapter 16, whereafter the figurine 12 can be readily withdrawn from adapter 16. After removal of threaded connector 20, the remains of adapter 16 can be removed from support base 13 and discarded and a new adapter 16 introduced to support a new figurine 12.

In this way it is possible to readily change the figurine 12 supported by support base 13 and thus to modify trophies in accordance with the needs of customers and the requirements of the season.

Thus, for example, trophies which comprise figurines engaged in winter sports can readily be assembled or changed employing the same base to trophies having summer sport figurines. Also, a stock of sub-assembled support bases 13 can be kept on hand for the ready insertion of any desired figurine.

Since the support base 13 is frequently of polished and often expensive wood and represents an expensive component of the trophy, the stock of support bases 13 kept on hand can be reduced thereby reducing overheads, employing the present invention.

The adapter 16 is suitably formed by injection molding a plastic. Suitable plastics include thermoplastic polymers, copolymers and terpolymers. The plastic is selected such that the gripping members 44 and 46 are resilient and deformable when urged outwardly in response to introduction of support rod 18, and yet may be readily severed from tubular wall 34 by a sufficient twisting or rotating force applied to support rod 18.

In the particular embodiment described, the support rod 18 has threads 28. While particular reference has been made to a threaded support rod 18 since such are conventionally employed in trophies for other means of attachment to the base, as mentioned above, other profiled surfaces may be employed on the support rod 18 which will permit a secure gripping action by the gripping members 44 and 46.

Figure 1:
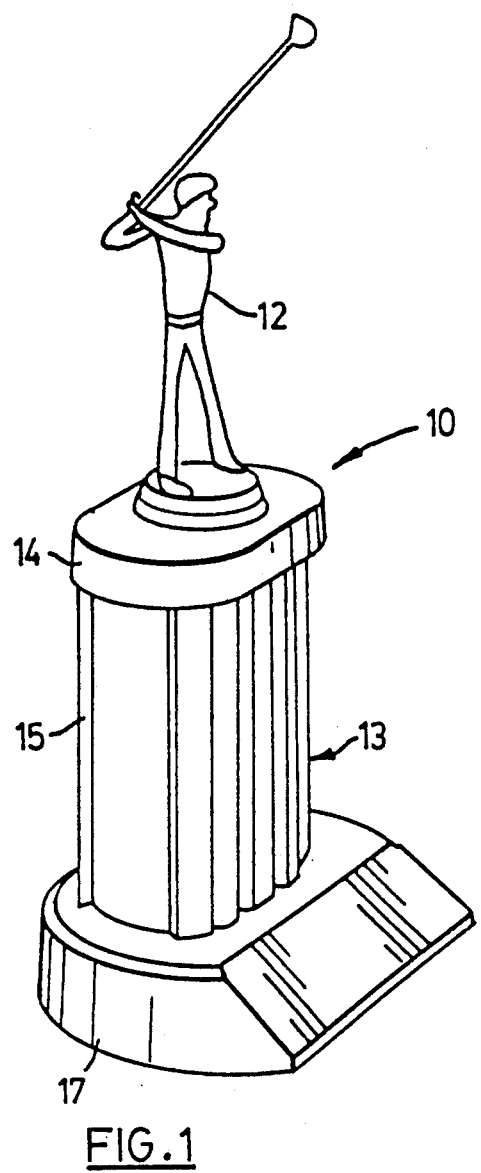
FIG. 1 is a perspective view of a trophy assembled in accordance with the invention.
Figure 5:
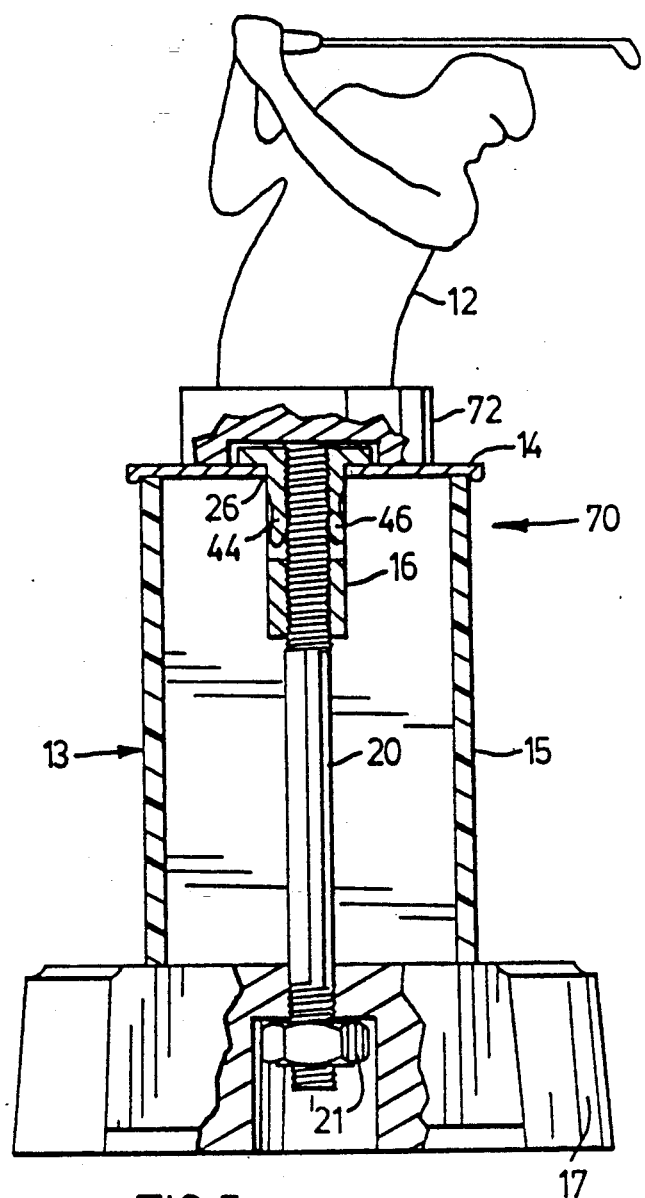
FIG. 5 is a vertical sectional view of another embodiment of the invention.

Referring next to FIG. 5, another embodiment of a trophy 70 is disclosed, which is similar to trophy 10 of FIGS. 1 through 4, and like reference numerals have been used in FIG. 5 to indicate similar components. However, in trophy 70, the upper portion 14 of support base 13 is simply a flat plate with a hole or bore 26 formed therein to accommodate adapter 16. Figurine 12 has a recessed base 72 to accommodate the head 32 of adapter 16.

Figure 6:
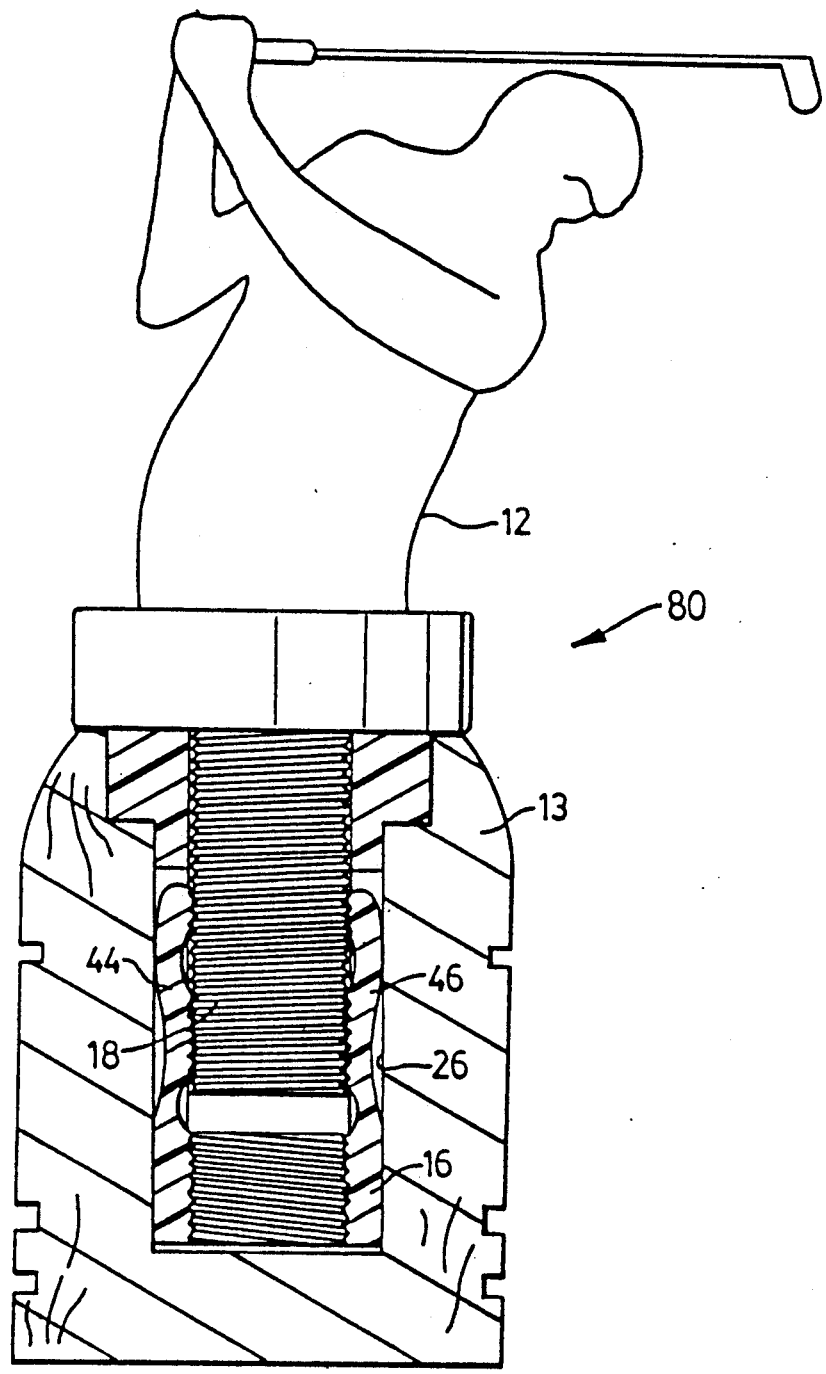
FIG. 6 is a vertical sectional view of yet another embodiment of the invention.

FIG. 6 shows yet another embodiment of a trophy 80. wherein the support base 13 is simply a solid body, for example, made from wood, having a bore 26 to accommodate adapter 16. In this embodiment, the means for retaining the tubular element or adapter 16 in bore 26 is simply the gripping members 44, 46 being pushed outwardly by threaded rod 18 to engage the walls of bore 26. In this embodiment, however, it will be noted that the gripping members 44, 46 are hingeably connected to the lower portion of adapter 16 and extend upwardly. This facilitates the removal of adapter 16 by breaking off gripping members 44, 46 where figurine 12 is turned or screwed further into adapter 16. In this instance, the threads of support rod 18 would pull upwardly as well as twist gripping members 44, 46 to help break them off.

It will be appreciated that either type of adapter 16 discussed above can be used in any of the trophies described herein.

What is claimed is:

1. An adaptor for removably mounting a body having a support rod, on a support base, comprising:
   a tubular element having a tubular wall adapted to be mounted in a bore of a support base, said tubular element having a central passage for axially receiving a support rod of a body to be mounted on the support base;
   at least one resilient, deformable gripping member integral with said tubular wall and extending into the central passage to engage and retain the support rod located therein;
   said tubular wall having a slot associated with each gripping member;
   the gripping member having a serpentine gripping portion deformable longitudinally and transversely into said slot; and
   means for retaining the tubular element in said bore.

2. An adapter according to claim 1, wherein said tubular element is moulded from a plastic.

3. An adaptor according to claim 2, wherein said at least one gripping element comprises a pair of resilient, deformable gripping members integral with said tubular wall, and extending inwardly of said central passage in opposed facing relationship.

4. An adapter according to claim 3, wherein the gripping members each include an inner resilient, deformable gripping portion extending inwardly of said central passage to grippingly engage the support rod, an intermediate portion, and a resilient gripping distal end portion also grippingly engaging the support rod.

5. An adapter according to claim 4, wherein said intermediate portion comprises a locking portion adapted to deformably engage the bore of the support base.

6. An adapter according to claim 5 wherein the locking portion engaging the support base is said means for retaining the tubular element in said bore.

7. An adapter according to claim 2 wherein the gripping member is a frangible member, being severable from the tubular wall by a twisting force applied to the threaded rod.

8. An adapter according to claim 1 wherein the tubular element central passage has a threaded lower portion, and wherein the means for retaining the tubular element is a threaded connector mounted in the support base and threadably connected to said threaded lower portion.

9. An adapter according to claim 1 wherein each gripping member includes an inner resilient, deformable gripping portion extending inwardly of said central passage to grippingly engage the support rod, an intermediate portion, and a resilient gripping distal end portion also grippingly engaging the support rod.

10. An adapter according to claim 9 wherein said intermediate portion has a locking portion adapted to deformably engage the bore of the support base, said locking portion being the means for retaining the tubular element in said bore.

* * * * *